United States Patent
Eiraku et al.

(10) Patent No.: US 7,957,886 B2
(45) Date of Patent: Jun. 7, 2011

(54) APPARATUS FOR AND METHOD OF CONTROLLING INTERNAL COMBUSTION ENGINE EQUIPPED WITH TURBOCHARGER

(75) Inventors: Akira Eiraku, Sunto-gun (JP); Hiroshi Yamashita, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 465 days.

(21) Appl. No.: 12/225,534

(22) PCT Filed: Oct. 11, 2007

(86) PCT No.: PCT/IB2007/003020
§ 371 (c)(1),
(2), (4) Date: Sep. 24, 2008

(87) PCT Pub. No.: WO2008/050194
PCT Pub. Date: May 2, 2008

(65) Prior Publication Data
US 2009/0259386 A1     Oct. 15, 2009

(30) Foreign Application Priority Data
Oct. 26, 2006   (JP) ................................. 2006-291585

(51) Int. Cl.
*F02B 33/44* (2006.01)
(52) U.S. Cl. .......................................... 701/102; 60/608
(58) Field of Classification Search ................. 123/207; 60/601, 602, 603, 605.1, 608, 611; 701/102
See application file for complete search history.

(56) References Cited

U.S. PATENT DOCUMENTS

| | | | |
|---|---|---|---|
| 5,025,629 A | 6/1991 | Woollenweber | |
| 5,585,553 A * | 12/1996 | Schricker | 73/114.37 |
| 6,715,287 B1 | 4/2004 | Engel et al. | |
| 6,904,353 B1 * | 6/2005 | Kolavennu et al. | 701/102 |
| 7,260,933 B2 * | 8/2007 | Barba et al. | 60/605.1 |
| 7,509,803 B2 * | 3/2009 | Panciroli | 60/600 |
| 2002/0088226 A1 * | 7/2002 | Haupt et al. | 60/602 |
| 2003/0101723 A1 * | 6/2003 | Birkner et al. | 60/602 |
| 2004/0006985 A1 | 1/2004 | Wild et al. | |
| 2006/0207252 A1 * | 9/2006 | Isobe et al. | 60/601 |
| 2007/0227500 A1 | 10/2007 | Dingl et al. | |
| 2008/0033627 A1 | 2/2008 | Tanaka | |
| 2009/0013688 A1 * | 1/2009 | Panciroli | 60/602 |
| 2009/0090107 A1 * | 4/2009 | Youssef et al. | 60/602 |
| 2011/0041493 A1 * | 2/2011 | Doering et al. | 60/603 |

FOREIGN PATENT DOCUMENTS

| | | |
|---|---|---|
| DE | 10 2004 030 604 B3 | 2/2006 |
| JP | A-2003-518581 | 6/2003 |
| JP | A-2003-293821 | 10/2003 |
| JP | A-2005-155384 | 6/2005 |
| JP | A-2006-022764 | 1/2006 |
| WO | WO 2006/075539 A1 | 7/2006 |

* cited by examiner

*Primary Examiner* — Thomas N Moulis
(74) *Attorney, Agent, or Firm* — Oliff & Berridge, PLC

(57) ABSTRACT

A compressor flow rate is calculated using a compressor model, which is the physical model of a compressor. A plurality of the compressor models are provided, and the compressor model used for calculating the compressor flow rate is changed in accordance with an operational condition of an internal combustion engine.

12 Claims, 4 Drawing Sheets

APPARATUS FOR AND METHOD OF CONTROLLING INTERNAL COMBUSTION ENGINE EQUIPPED WITH TURBOCHARGER

BACKGROUND OF THE INVENTION

1. Field of the Invention

The invention relates to a control apparatus and control method for an internal combustion engine equipped with a turbocharger, and more specifically, to a control apparatus and a control method for the internal combustion engine based on a flow rate in a compressor of the turbocharger.

2. Description of the Related Art

As means for estimating a flow rate of the air taken into cylinders (hereinafter referred to as "cylinder intake-air flow rate"), a method using a physical model of an air intake system is available. Japanese Patent Application Publications No. 2005-155384, 2006-22764, and 2003-293821 (JP-A-2005-155384, JP-A-2006-22764, and JP-A-2003-293821) and Published Japanese Translation of PCT application No. 2003-518581 (JP-A-2003-518581) describe methods of estimating the cylinder intake-air flow rate of an internal combustion engine equipped with a turbocharger. In the internal combustion engine equipped with a turbocharger, a compressor model that models a compressor is used as one of the physical models of the air intake system. In the compressor model, a flow rate of the air flowing through the compressor (hereinafter referred to as the "compressor flow rate") is calculated based on a plurality of parameters, such as pressures upstream and downstream of the compressor, and a turbine speed.

However, a conventional compressor model is designed focusing on the flow rate characteristics when the compressor is in a supercharging state. Therefore, when the pressure downstream of the compressor is higher than the pressure upstream thereof, the compressor flow rate can be estimated with high accuracy. However, due to the aforementioned reason, there is a problem that when the pressure downstream of the compressor is equal to or lower than the upstream pressure, the accuracy in estimating the compressor flow rate is degraded, and the compressor flow rate is estimated to be lower than the actual flow rate. The pressure downstream of the compressor becomes lower than the upstream pressure when, for example, a throttle is rapidly opened to rapidly accelerate a vehicle.

The cylinder intake-air flow rate is calculated based on the compressor flow rate. Therefore, if the compressor flow rate is estimated to be lower than the actual flow rate, the cylinder intake-air flow rate is also estimated to be lower than the actual flow rate. As a result, a fuel injection amount calculated based on the estimated cylinder intake-air flow rate results in becoming smaller than the required amount corresponding to the actual cylinder intake-air flow rate, and the air-fuel ratio is therefore shifted to the lean side.

SUMMARY OF THE INVENTION

The invention provides a control apparatus and a control method for an internal combustion engine equipped with a turbocharger that allows a compressor flow rate used for controlling the internal combustion engine to be estimated with high accuracy.

A control apparatus for an internal combustion engine equipped with a turbocharger according to a first aspect of the invention includes a plurality of compressor models, a selection portion and a controller. The compressor models are physical models of the compressor of the turbocharger. The selection portion selects one of the plurality of compressor models in accordance with an operating condition of the internal combustion engine. The controller calculates a compressor flow rate, which is the flow rate of air flowing through the compressor using the selected compressor model, and controls the internal combustion engine based on the compressor flow rate calculated.

According to the aforementioned first aspect of the invention, it is possible to change the method of calculating the compressor flow rate in accordance with the operating condition of the internal combustion engine. Therefore, the accuracy in estimating the compressor flow rate is less likely to be affected by the operating condition of the internal combustion engine, compared to the case where a single compressor model is used in calculation of the compressor flow rate. In summary, it is possible to estimate the compressor flow rate with high accuracy independently of the operating condition of the internal combustion engine.

According to the aforementioned aspect, in the plurality of compressor models include a compressor upstream pressure, a compressor downstream pressure, and a turbine speed as parameters.

According to the aforementioned aspect, it is possible to estimate the compressor flow rate with high accuracy by using the pressures upstream and downstream of the compressor, and the turbine speed as parameters of the compressor model.

According to the aforementioned aspect, the plurality of compressor models may include a first compressor model, and a second compressor model in which a correction flow rate model for calculating a correction flow rate of the compressor flow rate is integrated into the first compressor model. Further, the selection portion may select the second compressor model in a predetermined operating condition of the internal combustion engine where the accuracy in calculating the compressor flow rate using the first compressor model is degraded.

According to the aforementioned aspect, when the internal combustion engine is operated in a predetermined operating condition where the accuracy in estimating the compressor flow rate using the first compressor model is degraded, the model (second compressor model) in which the correction flow rate model is integrated into the first compressor model is employed, so that it is possible to compensate for degradation of the accuracy in estimation made using the first compressor model in the predetermined operating condition. In this way, it is made possible to estimate the compressor flow rate with high accuracy in any case.

According to the aforementioned aspect, the correction flow rate model may be designed such that the correction flow rate is calculated to correct the compressor flow rate calculated using the first compressor model to increase. Further, the predetermined operating condition may be the condition where the compressor downstream pressure is equal to or lower than the compressor upstream pressure, and the selection portion may select the first compressor model when the compressor downstream pressure is higher than the compressor upstream pressure.

According to the aforementioned aspect, when the compressor downstream pressure is equal to or lower than the compressor upstream pressure, the correction flow rate model is used to correct the compressor flow rate to increase. In this way, even when the conventional compressor model is used as the first compressor model, it is possible to estimate the compressor flow rate with high accuracy independently of which of the compressor downstream pressure and the compressor upstream pressure is higher than the other.

According to the aforementioned aspect, in the correction flow rate model includes the compressor upstream pressure and the compressor downstream pressure as parameters.

According to the aforementioned aspect, it is possible to correct the compressor flow rate with high accuracy by using the compressor upstream pressure and the compressor downstream pressure as parameters of the correction flow rate model.

According to the aforementioned aspect, the correction flow rate model may be designed such that, when the compressor downstream pressure is higher than the compressor upstream pressure, the correction flow rate is set to 0, and, when the compressor downstream pressure is lower than the compressor upstream pressure, the lower the compressor downstream pressure is, the higher the correction flow rate is set.

In a control method for an internal combustion engine equipped with a turbocharger according to a second aspect of the invention, the compressor flow rate, which is the flow rate of air flowing through a compressor of the turbocharger, is calculated based on a compressor upstream pressure, a compressor downstream pressure, and a turbine speed. Then the internal combustion engine is controlled based on the calculated compressor flow rate. When the compressor downstream pressure is equal to or lower than the compressor upstream pressure, the internal combustion engine is controlled based on the calculated compressor flow rate to which a correction flow rate is added.

According to the second aspect of the invention, calculations may be performed in the following manner: a throttle flow rate, which is the flow rate of the air flowing through a throttle, and a cylinder intake-air flow rate, which is the flow rate of the air taken into a cylinder, are calculated based on the compressor downstream pressure and a pressure downstream of the throttle that is disposed downstream of the compressor; and the compressor downstream pressure is calculated based on the throttle flow rate and the compressor flow rate to update the compressor downstream pressure, and the throttle downstream pressure is calculated based on the throttle flow rate and the cylinder intake-air flow rate to update the throttle downstream pressure.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF THE EXAMPLE EMBODIMENT

Figure 1:
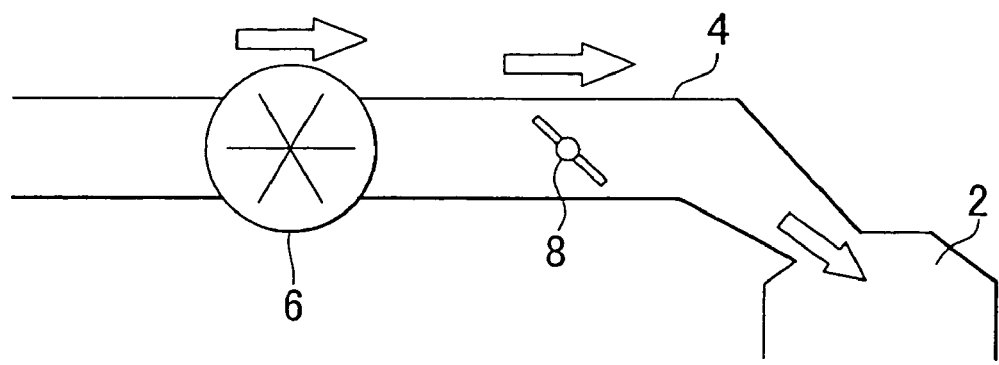
FIG. 1 schematically shows a construction of an internal combustion engine to which a control apparatus according to an embodiment of the invention is applied.

An example embodiment of the invention will be described with reference to FIGS. 1 to 6. As shown in FIG. 1, the internal combustion engine (hereinafter referred to as the "engine") includes a compressor 6 in an intake passage 4 connected to cylinders 2. The compressor 6 is connected to a turbine disposed in an exhaust passage (not shown), and forms the turbocharger together with the turbine. An electronically controlled throttle 8 is disposed downstream of the compressor 6 in the intake passage 4.

The control apparatus includes an Electronic Control Unit (ECU) (not shown). The ECU controls the engine and calculates various physical quantities using physical models, which will be described later. As described below, the control apparatus according to the embodiment estimates a flow rate of the air taken into the cylinders 2 using the physical model of an air intake system. Since the control apparatus according to the embodiment is applied to a turbocharged engine, a compressor model that models the compressor 6 is used as the physical model of the air intake system. The detail of the compressor model will be described later. The value of the estimated flow rate of the air taken into the cylinders 2 (hereinafter referred to as the "cylinder intake-air flow rate") is used in various calculations relating to the engine control, such as calculations of the engine load and fuel injection amount.

The physical quantities used in calculation of the cylinder intake-air flow rate Mc are as follows: a pressure Pa upstream of the compressor 6 (hereinafter referred to as the "compressor upstream pressure Pa"); a pressure Pc downstream of the compressor 6 (hereinafter referred to as the "compressor downstream pressure Pc"); a pressure Pm downstream of the throttle 8 (hereinafter referred to as the "throttle downstream pressure Pm"); a flow rate Mcomp of the air flowing through the compressor 6 (hereinafter referred to as the "compressor flow rate Mcomp"); and a flow rate Mt of the air flowing through the throttle 8 (hereinafter referred to as the "throttle flow rate Mt"). Among the physical quantities Pa, Pc, Pm, Mcomp, and Mt, the compressor upstream pressure Pa is actually measured by an atmospheric pressure sensor (not shown). The remaining physical quantities Pc, Pm, Mcomp, and Mt are obtained through calculations.

Figure 2:
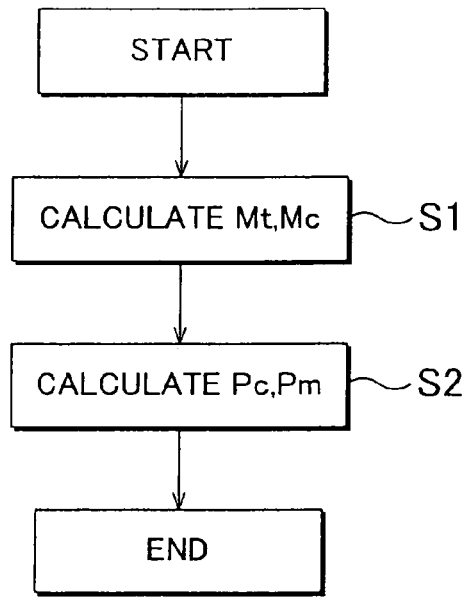
FIG. 2 is a flowchart showing a calculation routine used to calculate a cylinder intake-air flow rate in the embodiment of the invention.

The cylinder intake-air flow rate Mc is calculated in accordance with a calculation routine shown by a flowchart in FIG. 2. The calculation routine shown in FIG. 2 is repeatedly executed in a certain cycle, and the value of the cylinder intake-air flow rate Mc is newly calculated in every execution of the calculation routine.

In step S1 as a first step in the routine, the throttle flow rate Mt and the cylinder intake-air flow rate Mc are calculated. The throttle flow rate Mt is calculated using an expression (1) below. In the expression (1), f(x) represents a function of x. Further, the throttle downstream pressure Pm and the compressor downstream pressure Pc are the values that have been stored in a memory, that is, the values that have been obtained in the preceding execution of the calculation routine.

$$Mt = f(Pm/Pc) \tag{1}$$

The cylinder intake-air flow rate Mc is calculated by an expression (2) below. The throttle downstream pressure Pm in the expression (2) is the value that has been stored in the memory, that is, the value that has been obtained in the preceding execution of the calculation routine. Note that the values a and b are constant.

$$Mc = a \times Pm - b \quad (2)$$

Next, in step S2, the values of the compressor downstream pressure Pc and the throttle downstream pressure Pm are updated. An expression (3) below is used in calculation to update the compressor downstream pressure Pc. The throttle flow rate Mt in the expression (3) is the value calculated in step S1. How the compressor flow rate Mcomp is obtained will be described later. Note that the value K is constant.

$$Pc = Pc(\text{value obtained in preceding calculation}) + K \times (Mcomp - Mt) \quad (3)$$

An expression (4) below is used in calculation to update the value of the throttle downstream pressure Pm. The throttle flow rate Mt and the cylinder intake-air flow rate Mc in the expression (4) are the values calculated in step S1. The value Km is constant.

$$Pm = Pm(\text{value obtained in preceding calculation}) + Km \times (Mt - Mc) \quad (4)$$

Figure 3:
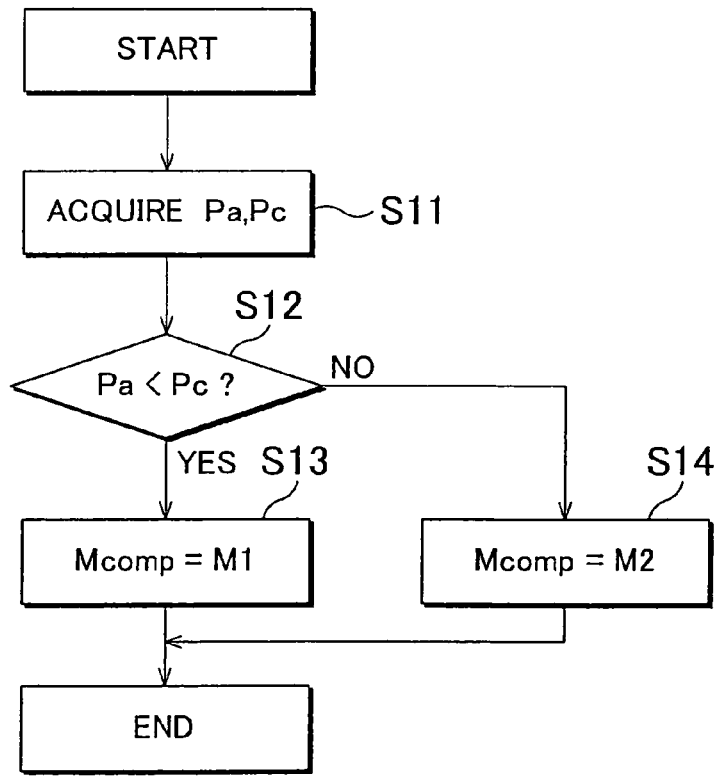
FIG. 3 is a flowchart showing a calculation routine used to calculate a compressor flow rate in the embodiment of the invention.

The compressor flow rate Mcomp used in calculation of the compressor downstream pressure Pc in step S2 is calculated in accordance with a calculation routine shown by a flowchart in FIG. 3. The calculation routine shown in FIG. 3 is executed in the process of step S2, and the compressor flow rate Mcomp is newly calculated in every execution of the calculation routine. It should be noted that in the embodiment, the "selection portion" according to the invention is realized by executing the calculation routine shown in FIG. 3.

In step S11 as a first step in the routine, the values of the compressor upstream pressure Pa and the compressor downstream pressure Pc are acquired. The compressor upstream pressure Pa is the actual measurement value measured by the atmospheric pressure sensor, and the compressor downstream pressure Pc is the value that has been stored in the memory, that is, the value that has been obtained in the preceding execution of the calculation routine shown in FIG. 2.

Next, in step S12, the values of the compressor upstream pressure Pa and the compressor downstream pressure Pc are compared to determine which is higher than the other. When, as a result of comparison, it is determined that the compressor downstream pressure Pc is higher than the compressor upstream pressure Pa, the process proceeds to step S13. On the other hand, when the compressor downstream pressure Pc is equal to or lower than the compressor upstream pressure Pa, the process proceeds to step S14.

In each of steps S13 and S14, the compressor flow rate Mcomp is calculated using a compressor model. In the embodiment, two different compressor models that have respective different flow rate characteristic settings are provided. The two compressor models are a first compressor model and a second compressor model. In step S13, a compressor flow rate M1 is calculated using the first compressor model, and is used as the compressor flow rate Mcomp. On the other hand, in step S14, a compressor flow rate M2 is calculated using the second compressor model, and is used as the compressor flow rate Mcomp.

Figure 4:
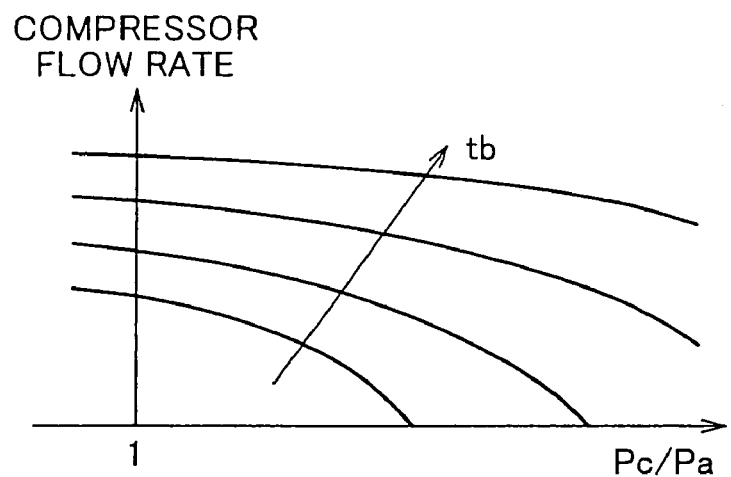
FIG. 4 is a graph showing the relation between compressor flow rate and pressure ratio in a first compressor model used in the embodiment.

The first compressor model is established focusing on the flow rate characteristics of the compressor 6 when the compressor 6 is in a supercharging state. FIG. 4 is a graph showing the relation between compressor flow rate M1 and pressure ratio Pc/Pa in the first compressor model using curves (constant turbine speed curves), along each of which turbine speed tb is constant. If the turbine speed tb is constant, the compressor flow rate M1 decreases as the pressure ratio Pc/Pa increases. If the pressure ratio Pc/Pa is constant, the compressor flow rate M1 increases as the turbine speed tb gets higher. In the first compressor model, the compressor flow rate M1 is defined by a function whose variables are the compressor downstream pressure Pc, the compressor upstream pressure Pa, and the turbine speed tb.

The relation between the compressor flow rate M1 and the pressure ratio Pc/Pa in the first compressor model is defined so as to cope with the conditions where the pressure ratio Pc/Pa becomes 1 or below. However, in the first compressor model, a function used to calculate the compressor flow rate M1 (that is, a function of Pa, Pc, and tb) is designed to be suited to the conditions where the pressure ratio Pc/Pa is larger than 1. Therefore, the accuracy in estimating the compressor flow rate M1 is not high when the pressure ratio Pc/Pa is equal to or smaller than 1. More specifically, when the pressure ratio Pc/Pa is equal to or smaller than 1, the compressor flow rate M1 calculated using the first compressor model becomes lower than the actual flow rate.

Figure 5:
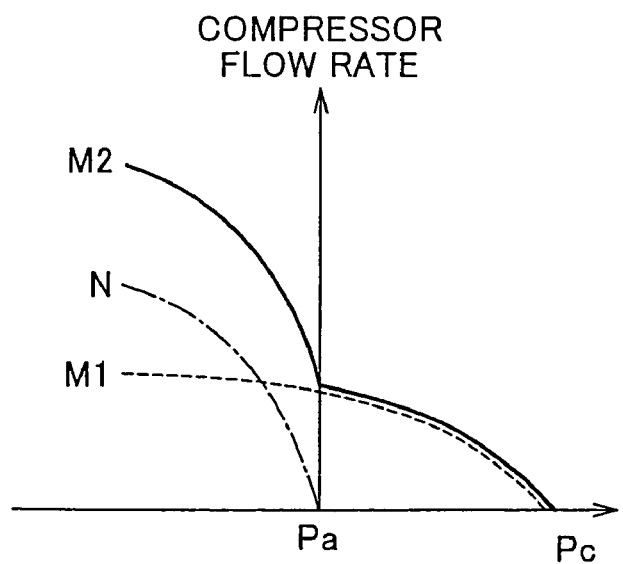
FIG. 5 is a graph showing the relation between compressor flow rate and compressor downstream pressure in compressor models used in the embodiment.

The second compressor model is designed to compensate for the difference (shortage) between the actual flow rate and the calculated flow rate when the compressor flow rate M1 calculated using the first compressor model is lower than the actual flow rate as described above. FIG. 5 is a graph showing the relations between compressor downstream pressure Pc and compressor flow rate M1, M2 of the first and second compressor models, respectively, using curves. The horizontal axis represents the compressor downstream pressure Pc. The turbine speed tb is constant along each curve. As shown in FIG. 5, the compressor flow rate M2 calculated using the second compressor model is the flow rate obtained by adding a correction flow rate N to the compressor flow rate M1 calculated using the first compressor model, and can be defined by an expression (5) below. The correction flow rate N is equivalent to the difference between the compressor flow rate M1 and the actual flow rate.

$$M2 = M1 + N \quad (5)$$

The correction flow rate N is calculated using a correction flow rate model. In the correction flow rate model, the correction flow rate N is defined by a function whose variables are the compressor downstream pressure Pc and the compressor upstream pressure Pa. According to the correction flow rate model, when the compressor downstream pressure Pc is higher than the compressor upstream pressure Pa, the correction flow rate N is 0, and, when the compressor downstream pressure Pc is lower than the compressor upstream pressure Pa, the lower the compressor downstream pressure Pc becomes, the higher the correction flow rate N is set. The second compressor model is obtained by integrating the correction flow rate model into the first compressor model.

Each compressor model may be represented by a function having a plurality of parameters. As the number of the parameters constituting the function is increased, more complex flow rate characteristics can be represented by the function. However, when the number of the parameters is increased, the number of times of adaptability tests to determine the values of the increased parameters needs to be increased. Further, in actuality, it is difficult to perform all the required adaptability tests with respect to all the possible operating conditions of the engine. Therefore, a conventional compressor model does not cover all the operating conditions of the engine, and is designed to calculate the flow rate with high accuracy under a predetermined operating condition. The aforementioned first compressor model is designed so that it is possible to calculate the flow rate in the engine being supercharged with high accuracy.

Taking the aforementioned characteristics of the compressor model into consideration, it is effective to use a plurality of different compressor models whose flow rate characteristics are differently designed, in order to perform flow rate calculation with high accuracy in all the possible operating conditions of the engine. When the compressor model used in flow rate calculation is changed according to the operating condition of the engine, the accuracy in estimating the compressor flow rate is less likely to be affected by the operating conditions of the engine, compared to the case where a single compressor model is used. That is, it is possible to estimate the compressor flow rate with high accuracy independently of the operating conditions of the engine. In the embodiment, the second compressor model whose flow rate characteristics are different from those of the first compressor model is provided in addition to the first compressor model, and the compressor model used in flow rate calculation is changed in accordance with the result of comparison between the compressor downstream pressure Pc and the compressor upstream pressure Pa.

The second compressor model is obtained by integrating the correction flow rate model into the first compressor model. In the correction flow rate model, the compressor flow rate is corrected to increase. When the engine is not supercharged, that is, when the compressor downstream pressure Pc is lower than the compressor upstream pressure Pa, using the second compressor model makes it possible to compensate for degradation of the accuracy in estimation made using the first compressor model when the engine is not supercharged. Thus, it is made possible to estimate the compressor flow rate with high accuracy independently of whether the engine is being supercharged.

Figure 6:
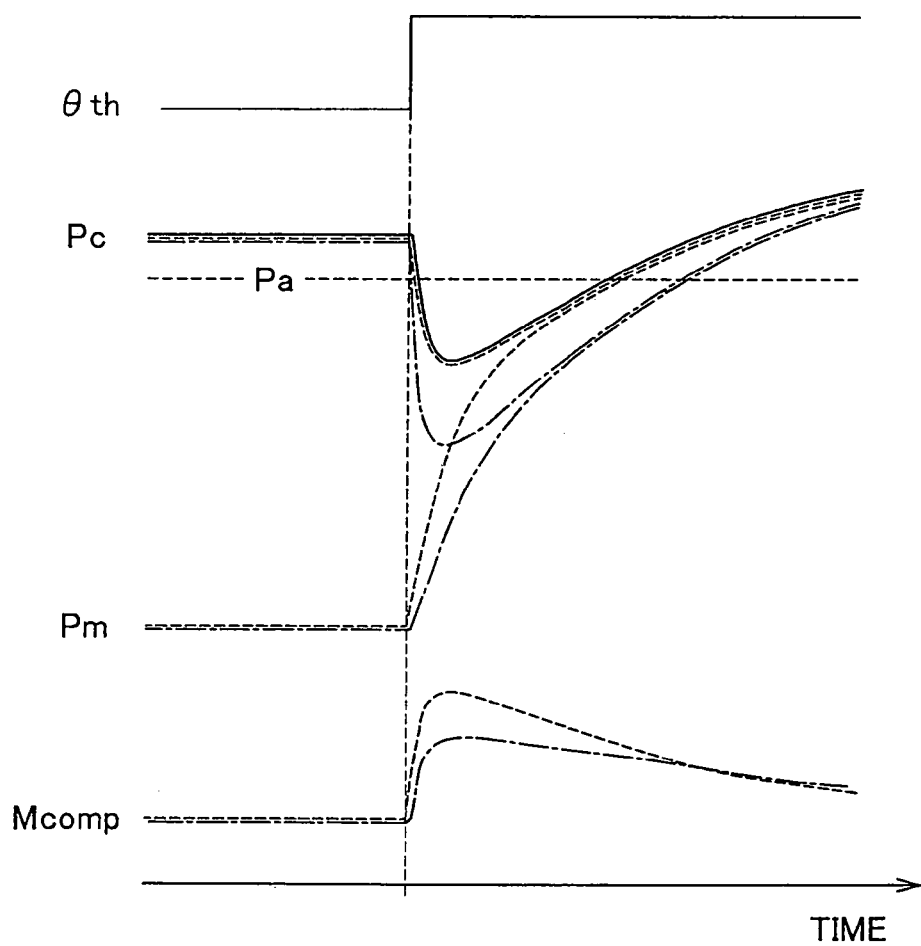
FIG. 6 is a time chart showing changes in calculated values of compressor downstream pressure, throttle downstream pressure, and compressor flow rate corresponding to changes of a throttle opening in the embodiment.

FIG. 6 is a time chart showing variations in the calculated values of the compressor downstream pressure Pc, throttle downstream pressure Pm, and compressor flow rate Mcomp, in response to a change of a throttle opening θth. In FIG. 6, the broken lines show the variations determined by calculation using the method of calculating the cylinder intake-air flow rate that is employed in the control apparatus according to the embodiment, that is, the method in which one of the first and the second compressor models is selectively used. The chain line shows the variations determined by calculation using the conventional method of calculating the cylinder intake-air flow rate, that is, the method in which only the first compressor model is used. Further, the solid line shows the actual measurement values of the compressor downstream pressure Pc.

As shown in FIG. 6, with the method of calculating the cylinder intake-air flow rate according to the embodiment, it becomes possible to estimate the compressor flow rate Mcomp to be higher compared to that estimated using the conventional method when the compressor downstream pressure Pc is lower than the compressor upstream pressure Pa. As a result, the calculated value of the compressor downstream pressure Pc can be made closer to the actual value, and consequently, it becomes possible to estimate the throttle downstream pressure Pm with high accuracy. As shown by the expression (2), the cylinder intake-air flow rate Mc is calculated based on the throttle downstream pressure Pm, and as a result, the cylinder intake-air flow rate Mc can be estimated with high accuracy. In this way, even when the throttle is rapidly opened, such as when the vehicle is rapidly accelerated, it is avoided that the cylinder intake-air flow rate is estimated to be lower than the actual flow rate, so that it is possible to prevent the air-fuel ratio from shifting to the lean side.

While the embodiment of the invention has been described above, the invention is not limited to the aforementioned embodiment, and may be embodied with various modifications and variations made within the spirit of the invention. For example, a modification as described below may be made to implement the invention.

The difference between the compressor flow rate M1 calculated using the first compressor model and the actual compressor flow rate can be affected by the turbine speed tb. In this case, the correction flow rate N may be defined by a function whose variables are compressor downstream pressure Pc, compressor upstream pressure Pa, and turbine speed tb.

Further, in each of the calculation routines shown in FIGS. 2 and 3, the compressor upstream pressure Pa used in the calculation may be a fixed value, instead of the actual measurement value.

The invention claimed is:

1. A control apparatus for an internal combustion engine equipped with a turbocharger, comprising:
   a plurality of compressor models that are the physical models of a compressor of the turbocharger;
   a selection portion that selects one of the plurality of compressor models in accordance with an operating condition of the internal combustion engine; and
   a controller that calculates a compressor flow rate, which is the flow rate of air flowing through the compressor using the selected compressor model, and controls the internal combustion engine based on the compressor flow rate calculated.

2. The control apparatus according to claim 1, wherein the plurality of compressor models include a compressor upstream pressure, a compressor downstream pressure, and a turbine speed as parameters.

3. The control apparatus according to claim 2, wherein:
   the plurality of compressor models include a first compressor model, and a second compressor model in which a correction flow rate model for calculating a correction flow rate of the compressor flow rate is integrated into the first compressor model; and
   the selection portion selects the second compressor model in a predetermined operating condition of the internal combustion engine where an accuracy in calculating the compressor flow rate using the first compressor model is degraded.

4. The control apparatus according to claim 3, wherein the correction flow rate model is designed such that the correction flow rate is calculated to correct the compressor flow rate calculated using the first compressor model to increase.

5. The control apparatus according to claim 4, wherein:
   the predetermined operating condition is the condition where the compressor downstream pressure is equal to or lower than the compressor upstream pressure; and
   the selection portion selects the first compressor model when the compressor downstream pressure is higher than the compressor upstream pressure.

6. The control apparatus according to claim 4, wherein the correction flow rate model includes the compressor upstream pressure and the compressor downstream pressure as parameters.

7. The control apparatus according to claim 6, wherein the correction flow rate model is designed such that, when the compressor downstream pressure is higher than the compressor upstream pressure, the correction flow rate is set to 0, and, when the compressor downstream pressure is lower than the compressor upstream pressure, the lower the compressor downstream pressure is, the higher the correction flow rate is set.

8. A control method for an internal combustion engine equipped with a turbocharger, comprising:
   calculating a compressor flow rate, which is the flow rate of air flowing through a compressor of the turbocharger, based on a compressor upstream pressure, a compressor downstream pressure, and a turbine speed; and
   controlling the internal combustion engine based on the calculated compressor flow rate,
   wherein the internal combustion engine is controlled based on the calculated compressor flow rate to which a correction flow rate is added, when the compressor downstream pressure is equal to or lower than the compressor upstream pressure.

9. The control method for an internal combustion engine according to claim 8, further comprising:
   calculating a throttle flow rate, which is the flow rate of air flowing through a throttle disposed downstream of the compressor, and a cylinder intake-air flow rate, which is the flow rate of air taken into a cylinder, based on the compressor downstream pressure and a pressure downstream of the throttle; and
   calculating the compressor downstream pressure based on the throttle flow rate and the compressor flow rate to update the compressor downstream pressure, and calculating the throttle downstream pressure based on the throttle flow rate and the cylinder intake-air flow rate to update the throttle downstream pressure.

10. The control apparatus according to claim 5, wherein the correction flow rate model includes the compressor upstream pressure and the compressor downstream pressure as parameters.

11. The control apparatus according to claim 10, wherein the correction flow rate model is designed such that, when the compressor downstream pressure is higher than the compressor upstream pressure, the correction flow rate is set to 0, and, when the compressor downstream pressure is lower than the compressor upstream pressure, the lower the compressor downstream pressure is, the higher the correction flow rate is set.

12. A control apparatus for an internal combustion engine equipped with a turbocharger, comprising:
   a plurality of compressor models that are the physical models of a compressor of the turbocharger;
   selection means for selecting one of the plurality of compressor models in accordance with an operating condition of the internal combustion engine; and
   control means for calculating a compressor flow rate, which is the flow rate of air flowing through the compressor using the selected compressor model, and controlling the internal combustion engine based on the compressor flow rate calculated.

\* \* \* \* \*